(12) United States Patent
Ferreira Moreno et al.

(10) Patent No.: US 12,019,627 B2
(45) Date of Patent: Jun. 25, 2024

(54) AUTOMATICALLY AND INCREMENTALLY SPECIFYING QUERIES THROUGH DIALOG UNDERSTANDING IN REAL TIME

(71) Applicant: INTERNATIONAL BUSINESS MACHINES CORPORATION, Armonk, NY (US)

(72) Inventors: Marcio Ferreira Moreno, Rio de Janeiro (BR); Isabela Drabik Chaves Chambers Ramos, Rio de Janeiro (BR); Rafael Rossi de Mello Brandao, Rio de Janeiro (BR); Guilherme Augusto Ferreira Lima, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 17/367,605

(22) Filed: Jul. 5, 2021

(65) Prior Publication Data

US 2023/0004555 A1   Jan. 5, 2023

(51) Int. Cl.
G06F 16/00    (2019.01)
G06F 16/242   (2019.01)
G06F 16/248   (2019.01)

(52) U.S. Cl.
CPC .......... *G06F 16/243* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 6,820,075 B2 | 11/2004 | Shanahan et al. |
| 7,769,757 B2 | 8/2010 | Grefenstette et al. |
| 7,870,117 B1 | 1/2011 | Rennison |
| 9,501,745 B2 | 11/2016 | Nitz et al. |
| 10,296,160 B2 | 5/2019 | Shah et al. |

(Continued)

FOREIGN PATENT DOCUMENTS

WO   2017041372 A1   3/2017

OTHER PUBLICATIONS

List of IBM Patents or Patent Applications Treated as Related, 2 pgs.

(Continued)

*Primary Examiner* — Thu Nguyet T Le
(74) *Attorney, Agent, or Firm* — Intelletek Law Group, PLLC; Gabriel Daniel, Esq.

(57) ABSTRACT

A computer-implemented method of performing an incremental specification of a query includes extracting text from each of a plurality of participants in a dialog. A contextual information is determined of the extracted text of one or more of the plurality of participants. A dialog understanding operation is performed by processing at least the contextual information of the extracted text in a knowledge graph to identify in the dialog at least one or more of a structural gap, an information about entities, relationships, and actions. Query information is provided responsive to the dialog for at least one of filling the identified structural gap, or for providing additional information about one or more of the identified entities, relationships or actions in the dialog.

20 Claims, 7 Drawing Sheets

(56) References Cited

U.S. PATENT DOCUMENTS

| | | | |
|---|---|---|---|
| 10,445,646 | B2 | 10/2019 | Sanchez et al. |
| 10,740,370 | B2 | 8/2020 | Campbell et al. |
| 10,958,599 | B1* | 3/2021 | Penov .................. G10L 15/183 |
| 11,442,992 | B1* | 9/2022 | Moon .................. G06N 20/00 |
| 11,694,281 | B1* | 7/2023 | Liu .................. G06N 3/082 |
| | | | 704/9 |
| 2009/0006357 | A1* | 1/2009 | Popescul ............. G06F 16/9558 |
| | | | 707/999.005 |
| 2017/0160813 | A1* | 6/2017 | Divakaran ............. G06N 3/006 |
| 2017/0250930 | A1 | 8/2017 | Ben-Itzhak |
| 2018/0129750 | A1 | 5/2018 | Wickramasuriya et al. |
| 2019/0237068 | A1* | 8/2019 | Canim .................. G10L 15/22 |
| 2020/0057946 | A1 | 2/2020 | Singaraju |

OTHER PUBLICATIONS

Moreno, M et al., "Representing Experts' Interpretive Trails with Hyperknowledge Specifications"; ICFET (2019); pp. 48-52, Beijing, China.

Chen, Y. et al., "Knowledge Expansion over Probabilistic Knowledge Bases"; SIGMOD (2014); pp. 649-660.

He, G. et al., "Mining Implicit Entity Preference from User-Item Interaction Data for Knowledge Graph Completion via Adversarial Learning"; International World Wide Web Conference Committee (2020); pp. 740-751.

Socher, R. et al., "Reasoning With Neural Tensor Networks for Knowledge Base Completion"; Stanford University (); 10 pgs, Stanford, CA USA.

Haase, P. et al., "Metaphactory: A Platform for Knowledge Graph Management"; Semantic Web (2019); IOS Press, 17 pgs.

Pages, R., "An Object-Oriented Approach to the Translation Between MOF Metaschemas", Doctoral Thesis (2009); 288 pgs, Polytechnic University of Catalonia, Barcelona, Spain.

Guo, D. et al., "Dialog-to-Action: Conversational Question Answering Over a Large-Scale Knowledge Base"; 32nd Conference on Neural Information Processing Systems (NeurIPS 2018), 10 pgs., Montréal, Canada.

Authors Disclosed Anonymously, "Contextual Inference in Underspecified Queries using Ontology-Driven NLP"; IP.com No. IPCOM000227426D (2013); 3 pgs.

Authors Disclosed Anonymously, "Continuous Improved Conversation Entities"; IP.com No. IPCOM000254529D (2018); 4 pgs.

Authors Disclosed Anonymously, "Adapting Conversation Based on Perceived User Expertise"; IP.com No. IPCOM000258019D (2019); 5 pgs.

Braziunas, D. "Decision-Theoretic Elicitation of Generalized Additive Utilities"; Doctoral Thesis, University of Toronto (2009), 309 pgs., Toronto, Canada.

Bates, M. et al., "The BBN/HARC Spoken Language Understanding System"; IEEE (1993); 4 pgs.

Ellkvist, T. et al., "Using Provenance to Support Real-Time Collaborative Design of Workflows"; Research Gate (2008); 14 pga.

Amavi, J. et al., "Natural Language Querying System Through Entity Enrichment"; CCIS (2020); 13 pgs.

Bouquet, P. et al., "Theories and Uses of Context in Knowledge Representation and Reasoning"; University of Liverpool (2002); 38 pgs.

Mell, P. et al., "Recommendations of the National Institute of Standards and Technology"; NIST Special Publication 800-145 (2011); 7 pgs.

* cited by examiner

AUTOMATICALLY AND INCREMENTALLY SPECIFYING QUERIES THROUGH DIALOG UNDERSTANDING IN REAL TIME

BACKGROUND

Technical Field

The present disclosure generally relates to systems and methods of querying, and more particularly, to a computer method and system for performing collaborative queries using artificial intelligence (AI).

Description of the Related Art

Recently, developed query systems and applications are mainly directed to activity recognition and/or information retrieval. For example, when a user clearly asks for a particular piece of information, such query systems can normally provide a response aligned with the query.

In the case of a collaboration of users, the substance of a query may be less developed because of multiple users searching for a solution in a particular discipline. For example, experts may be trying to work together to develop a solution, and such experts could benefit from assistance in the specified content of a query. Current query systems cannot fill in structural gaps of information between participants/collaborators based on an understanding of the context of a dialog, nor incrementally provide information based on a continuing dialog and/or feedback from participants/collaborators.

SUMMARY

According to one embodiment, a computer-implemented method of performing an incremental query specification includes extracting text from each of a plurality of participants in a dialog. The contextual information of the text extracted from one or more of the plurality of participants is determined. A dialog understanding operation is performed by processing at least the contextual information of the extracted text and a knowledge graph is used to identify in the dialog at least one or more of a structural gap, an information about entities, relationships, or actions. Query information is provided responsive to the dialog for at least one of filling the identified structural gap, or for providing additional information about one or more of the identified entities, relationships or actions in the dialog. The participants are provided with assistance in a collaboration that results in fast and accurate solutions.

In one embodiment, the query information is provided in real time. Real time is particularly advantageous when a conversation is occurring.

In one embodiment, the computer-implemented method includes incrementally providing additional query information based on additional dialog of the plurality of participants. The additional dialog may narrow the search or add items to obtain information. In this way, additional flexibility and accuracy is added to the method.

In one embodiment, the computer-implemented method includes incrementally providing additional query information in response to receiving feedback regarding a previously-provided query information. The feedback results in more accurate assistance.

In one embodiment, the computer-implemented method provides query information of a collaborative query based on multiple participants in the dialog. The method further includes processing text extracted from a current speech, structuring gaps and information as entities, relations and actions in a knowledge graph according to a domain ontology. Faster and more accurate results are provided to participants.

In one embodiment, the computer-implemented method includes identifying an indirect query based on at least one participant asking other participants a question, and providing the query information to all of the participants. Sometimes, the participants may not know how to directly query for certain information, but the indirect query inference procedure can provide assistance to the participants.

In one embodiment, the computer-implemented method includes building nested contextualized hypergraphs to represent possible or indirect queries. The nested hypergraphs will aid in providing query information more accurately and faster.

In one embodiment, the computer-implemented method includes mapping each contextualized hypergraph with ontologies according to a hierarchy of specified concepts and indirections. The mapping will help provide faster and accurate response for future queries of similar information.

In one embodiment, the computer-implemented method includes using natural language processing for the determining of the contextual information of the extracted text of the plurality of participants. As the participants speak or type in natural language, more flexibility and ease of use is provided.

In one embodiment, the computer-implemented method includes identifying and contextualizing concepts according to a dialog evolution, an environment and a profile of the plurality of participants. Faster and more accurate query information can be provided.

In an embodiment, a computing device is configured to perform query specification incrementally. The computing device includes a processor, a memory coupled to the processor. The memory stores instructions to cause the processor to perform acts including extracting text from each of a plurality of participants in a dialog. A contextual information of the extracted text of one or more of the plurality of participants is determined. A dialog understanding operation is performed by processing at least the contextual information of the extracted text in a knowledge graph to identify in the dialog at least one or more of a structural gap, an information about entities, relationships, and actions. Query information is output responsive to the dialog for at least one of filling the identified structural gap, or for providing additional information about one or more of the identified entities, relationships or actions in the dialog. The participants are provided with assistance in a collaboration that results in fast and accurate solutions.

In one embodiment, the query information is output to a dashboard, and the instructions cause processor to perform additional acts including the providing of the query information as a collaborative query based on multiple participants in the dialog. The query information is provided in real time. The dashboard provides a faster and more accurate way to query between participants.

In one embodiment, the instructions cause the processor to perform an act including providing additional query information based on additional dialog of the plurality of participants. Additional information can clarify the query, reducing the search and provision of less accurate results.

In one embodiment, the instructions cause the processor to perform an act including incrementally providing additional query information in response to receiving feedback regarding previously-provided query information. The incremental query information helps to tune the query so that a more accurate response can be provided.

In one embodiment, the instructions cause the processor to perform an act including identifying an indirect query based on at least one participant asking other participants a question, and outputting the query information to one or more of the participants. Indirect queries can anticipate a user query, saving time, and can provide information that can assist the participants.

In one embodiment, the instructions cause the processor to perform an act including building directed nested contextualized hypergraphs to represent possible or indirect queries. The directed nested contextualized hypergraphs will result in subsequent provisions of query information faster and more accurately.

In one embodiment, the instructions cause the processor to perform an act including mapping each contextualized hypergraph with ontologies according to a hierarchy of specified concepts and indirections. The mapping will speed up future queries and increase accuracy.

In one embodiment, the instructions cause the processor to perform an act including using natural language processing for the determining of the contextual information of the extracted text of the plurality of participants. Natural language processing increases the ease of use by the participants.

In one embodiment, the instructions cause the processor to perform an act including identifying and contextualizing concepts according to a dialog evolution, an environment and a profile of the plurality of participants. The profiles can be used to provide retrieval of more accurate information.

In an embodiment, a computing device is configured to perform query specification incrementally. The computing device includes one or more processors including a dialog processor configured to process extracted text from a plurality of participants of a collaborative query. A memory is coupled to the one or more processors. A plurality of modules are configured in the one or more processors including a capture manager configured to provide audio content to the dialog processor. A knowledge structurer is configured to identify structural gaps and information in the extracted text as entities, relationships, or actions in a knowledge graph. A dialog manager is configured to process the knowledge graph and to retrieve from a knowledge graph base a set of entities, relationships and actions to fill previously-identified gaps. Faster, more accurate query information and assistance with collaborative queries is provided.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high level, without detail, to avoid unnecessarily obscuring aspects of the present teachings.

A computer-implemented device and method to automatically and incrementally specify queries through dialog understanding in real time includes support of collaborative and indirect query specification from multiple user inputs in natural language.

Figure 1:
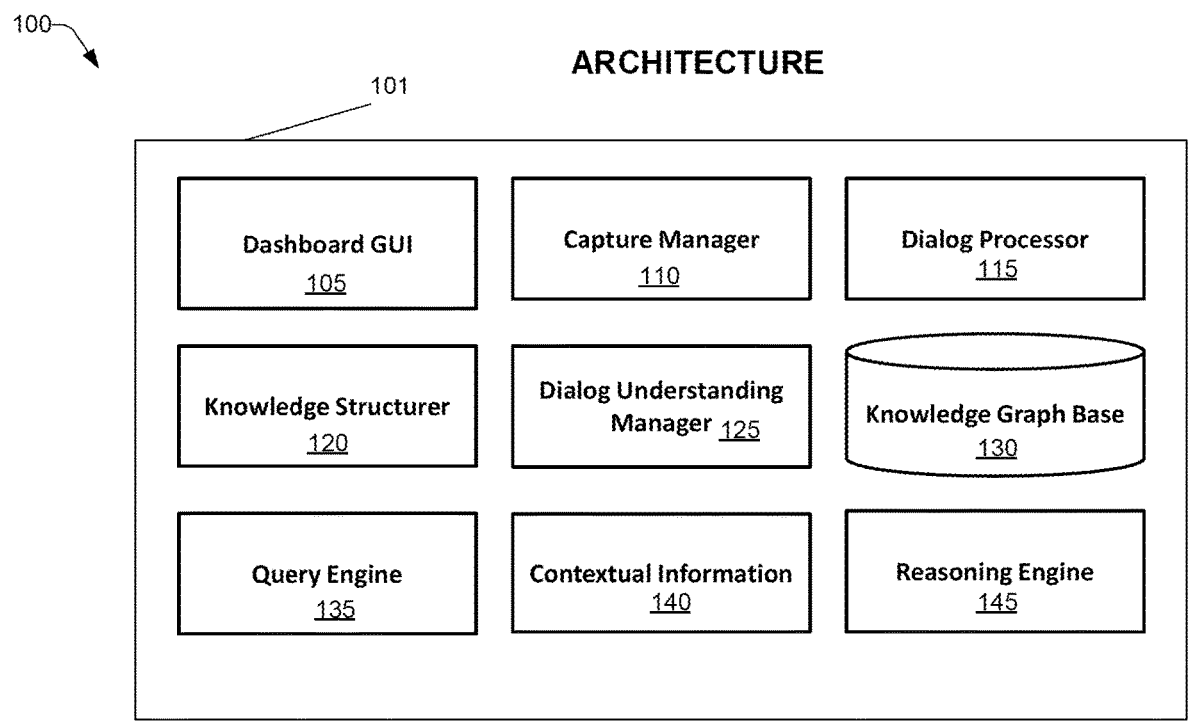
FIG. 1 is an architectural overview of a computer-implemented device to automatically and incrementally specify queries through dialog understanding in real time, consistent with an illustrative embodiment

FIG. 1 is an architectural overview 100 of a computer-implemented device to automatically and incrementally specify queries through dialog understanding in real time, consistent with an illustrative embodiment. It is to be understood that the present disclosure is not limited to the drawings, as there may be fewer elements or more elements than shown and described.

A dashboard graphic user interface (GUI) 105 is one way that participants may interact with the incremental query computing device and computer-implemented method. For example, selection of a domain ontology and starting of the capture manager 110 can occur through the dashboard GUI 105. In a case where participants are collaborating in oil exploration, a domain ontology selection will "tune" the query systems to terminology of that particular discipline (oil exploration). Thus, if there are structural gaps in a collaborative discussion, terms and information in this field can be provided to assist the participants.

The capture manager 110 delivers audio content for processing by a dialog processor 115. In turn, the dialog processor 115 processes content, and extracts text by participants identified as contextual information. The knowledge structurer 120 is configured to process text from extracted speech and generate a knowledge graph in a knowledge graph base 130. The knowledge structurer 120 identifies structuring gaps in the collaborative discussion and information as entities, relationships and actions in a selected ontology.

With continued reference to FIG. 1, the dialog understanding manager 125 works in conjunction with the Query engine 135 to process from the knowledge graph base a retrieved set of entities, relationships and actions that fill previously-identified gaps. The contextual information module 140 contextualizes and identifies the user speaking, which can include the type of device and the environment. The contextual information module 140 determines whether the user is adding information to fill in gaps, or asking for more information about any specific entities, relationships, or actions.

The reasoning engine 145 is configured to infer and obtain insights to create solutions to providing query information to the participants by processing current information and the graph in the knowledge graph base 130.

The computer-implemented method and computer device of the present disclosure advantageously provide improved accuracy and performance in query systems heretofore unknown, at least in terms of providing an understanding of the context of a collaboration by participants based in a particular ontology and providing query information to assist participants in a collaboration. The query information of the present disclosure advantageously provides an improvement in computer operation above and beyond the operation of known query systems, because the query information is provided in response to a conversation between participants. By virtue of the teachings herein, more accurate answers can be provided to collaborators, thus resulting in a reduction in processing overhead and storage realized, as well as a reduction in power consumed.

Additional advantages of the computer-implemented method and device of the present disclosure are disclosed herein.

Example Embodiments

Figure 2:
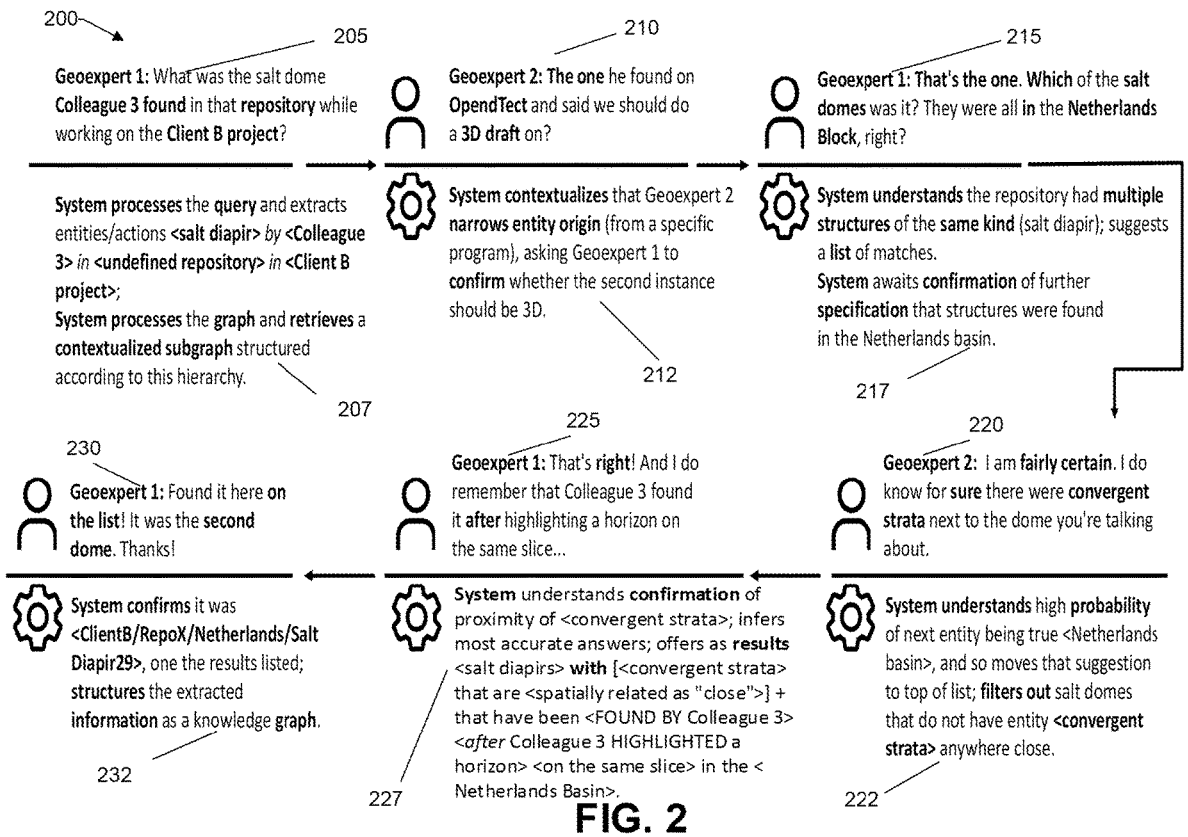
FIG. 2 illustrates a non-exhaustive example of an incremental specification of queries through dialog understanding, consistent with an illustrative embodiment.

FIG. 2 illustrates in 200 a non-exhaustive example of an incremental specification of queries through dialog understanding, consistent with an illustrative embodiment. FIG. 2 is a collaborative conversation between geology experts (Geoexperts 1 and 2). Geoexpert 1 asks what was the salt dome 205 that Colleague 3 found in that repository while working on Client project B? The system at 207 processes the query and extracts entities/actions about salt domes in an undefined repository of Client B project.

Geoexpert 2 replies at 210 that it was the salt dome found on OpendTect and said we do should a 3D draft. The system at 212 contextualizes that Geoexpert 2's reply narrows the scope of the query by asking Geoexpert 1 confirms whether the second instance should be 3D. Geoexpert 1 at 215 confirms the second instance, and Geoexpert 1 then asks whether they were in The Netherlands block. At 217, the system suggests a list of matches with multiple structures. At 220, the Geoexpert 2 responds to confirm to the system. At 225, the Geoexpert 1 agrees with Geoexpert 2 and adds information about what Colleague 3 found. At 227, the system then understands confirmation of proximity of convergent strata and infers accurate answers and offers results. Finally, Geoexpert 1 notes he found the dome that was second on the list, and the system confirms and updates a knowledge graph. Thus, the query system assists in the collaboration of information being exchanged with the two Geoexperts to provide them with accurate information much faster than if they tried without the system, in particular, because they did not know how to formulate a query for that specific information.

Figure 3:
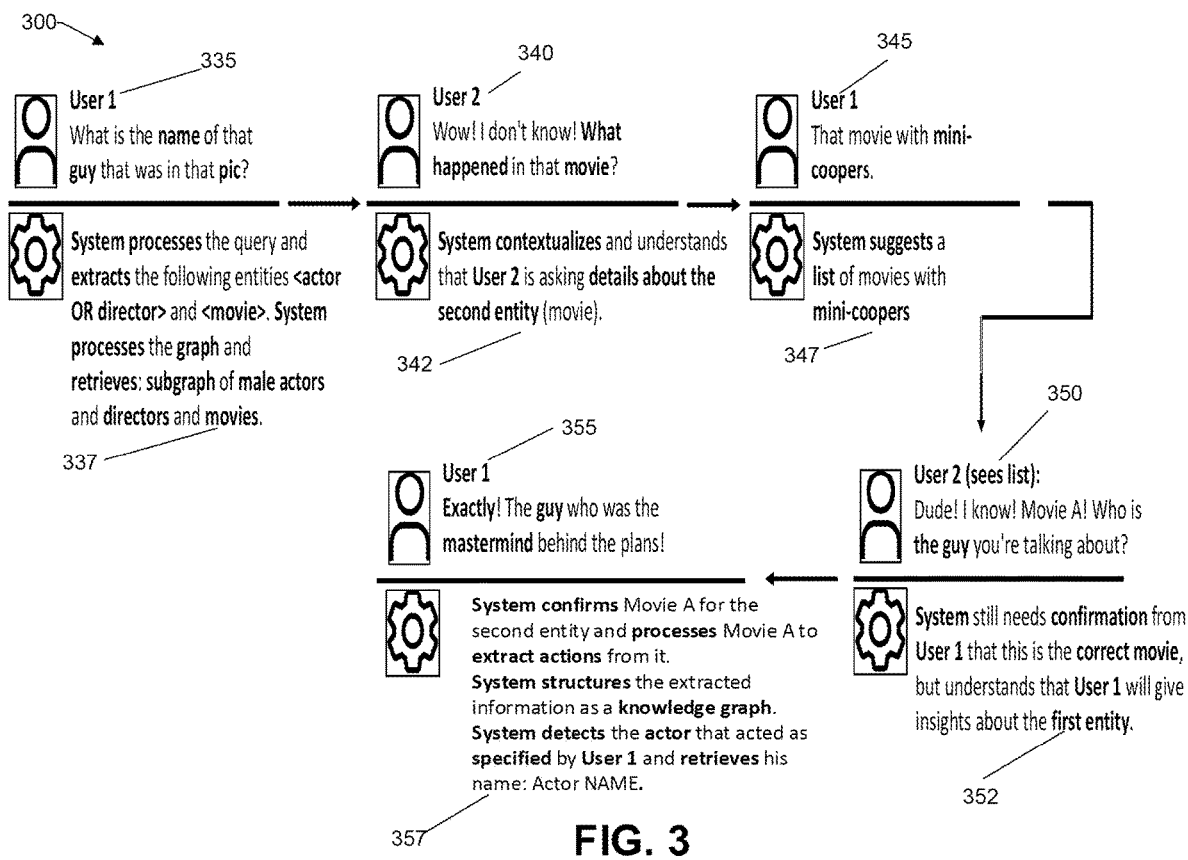
FIG. 3 illustrates another non-exhaustive example of incremental specifying queries through dialog understanding, consistent with an illustrative embodiment.

FIG. 3 illustrates another non-exhaustive example 300 of incremental specifying queriers through dialog understanding, consistent with an illustrative embodiment. Whereas in FIG. 2, an ontology domain of geology (e.g., via dashboard GUI) could have been entered to narrow the focus of the query system, FIG. 3 is directed to popular knowledge, particularly movies. At 335 and 340, User 1 and User 2 are trying to remember or find out the name of an actor in a movie. At 337, the system processes queries and extracts entities about actors, directors, and retrieves a subgraph of male actors and/or directors (the first entity) and movies (the second entity). At 342, the system contextualizes that User 2 is asking details about the second entity (movies). At 345, in response to user 1 providing more information (the type of vehicle used in the movie), at 347 the system suggests a list of movies. User 2 notes at 350 he knows the movie based on the list, but the system needs confirmation at 352 from User 1 that the movie identified by User 2 is correct. After User 1 confirms the correct movie at 355, the system at 375 confirms the movie and processes the movie to extract actions from it and retrieves the actor's name. Thus, the query system assists the two users in obtaining information that they wanted.

Example Process

Figure 4:
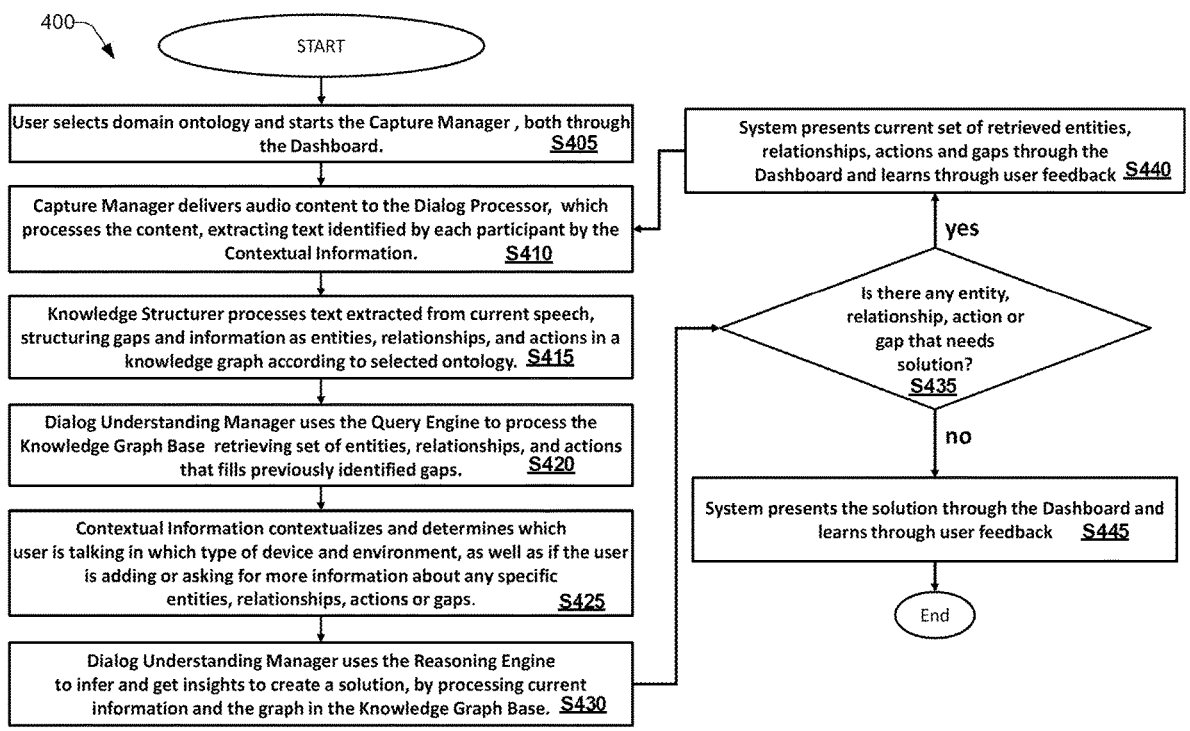
FIG. 4 is a flowchart illustrating a computer-implemented method of automatically performing and incrementally specifying queries through dialog understanding in real time, consistent with an illustrative embodiment.

With the foregoing overview of the example architecture, it may be helpful now to consider a high-level discussion of an example process. To that end, FIG. 4 is a flowchart illustrating a computer-implemented method of automatically performing and incrementally specifying queries through dialog understanding in real time, consistent with an illustrative embodiment. FIG. 4 is shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At operation S405, the user selects a domain ontology and starts the Capture Manager (see FIG. 1) through a dashboard. It is to be understood that operation S405 is optional, as the query system can also activate in response to receiving audio information, and can operate with a domain ontology selected. However, selection of a domain ontology will likely speed up the computer-implemented method. If no domain ontology is selected, the query system can infer this information, and/or may prompt for confirmation.

At operation S410, the capture manger delivers content to the dialog processor (see FIG. 1), which processes the content extracts text identified by each participant by the contextual information.

At operation S415, the knowledge structurer processes text extracted from current speech, structuring gaps in a collaborative conversation and information as entities, relationships and actions in a knowledge graph according to the selected ontology. A knowledge base can be used to store a knowledge graph.

At operation S420, the dialog understanding manager uses a query engine to process the knowledge graph base to retrieve a set of entities, relationships and actions that fill previously identified gaps. For example, in FIG. 2 the system at 217 and 222 is providing lists, and asks for confirmation of information provided and also sends a list of information of responses.

At operation S425, the contextual module will contextualize information and determine which user is talking in which type of device. The system determines if the user is clarifying or asking for more information.

At operation S430, the dialog understanding manager communicates with the reasoning engine to infer and gain insight to create a solution by processing current information and a graph in the knowledge graph base.

At operation S435, there is a determination as to whether any entity, relationship or gap needs a solution. For example, the participants may be still striving to find an answer to a question, and the query system can determine if additional assistance is to be provided.

At operation S440, as the system has determined at S435 that additional solutions are required, a least one solution is presented to participants, which may be presented via the dashboard. The method then returns to operation S410. Based on user feedback, the query system learns to improve the accuracy and response of current queries and future queries as well.

If at S435 it is determined that there are no additional solutions requested, the system presents the solution S445, for example, through the dashboard, and learns through feedback.

Example Particularly Configured Computer Hardware Platform

Figure 5:
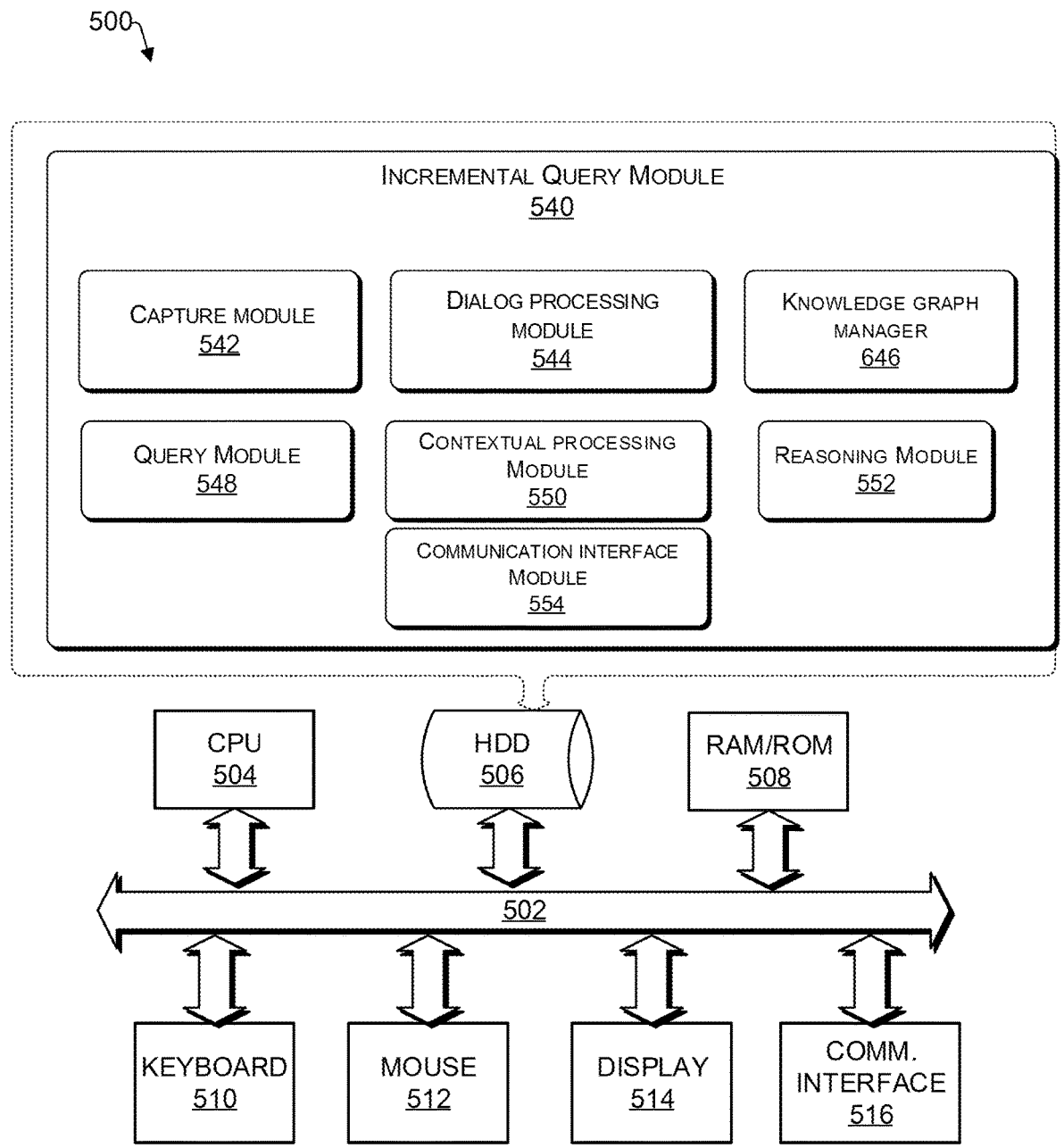
FIG. 5 is a functional block diagram illustration of a particularly configured computer hardware platform, consistent with an illustrative embodiment.

FIG. 5 provides a functional block diagram illustration 500 of a computer hardware platform. In particular, FIG. 5 illustrates a particularly configured network or host computer platform 500, as may be used to implement the method shown in FIG. 4.

The computer platform 500 may include a central processing unit (CPU) 504, a hard disk drive (HDD) 506, random access memory (RAM) and/or read-only memory (ROM) 508, a keyboard 510, a mouse 512, a display 514, and a communication interface 516, which are connected to a system bus 502. The HDD 506 can include data stores.

In one embodiment, the HDD 506 has capabilities that include storing a program that can execute various processes, such as machine learning.

In FIG. 5, there are various modules shown as discrete components for ease of explanation. However, it is to be understood that the functionality of such modules and the quantity of the modules may be fewer or greater than shown. It is to be understood that the modules shown and described herein can be trained by machine learning both to train and update their various operations.

The incremental query module 540 is configured to control the operation of the incremental queries based on dialog understanding in modules 542-552 to perform incrementally in real time, consistent with an illustrative embodiment.

The capture module 542 is configured to deliver audio content to the dialog processing module 544. The dialog processing module 544 is configured to process audio and text content, and identify extracted text of each participant as contextual information (see FIG. 3 at 342 for contextual information).

The knowledge graph manager 546 is configured to process text from current speech, and identify structuring gaps in the speech. The knowledge graph manager 546 also identifies information to be a subject of the query as entities. The entities and their relationships and actions, and the structuring gaps in the speech are arranged in a knowledge graph.

The query module 548 is an engine configured to configured to process the knowledge graph base (see FIG. 1) to retrieve a set of entities, relationships, and actions that fill previously identified structural gaps in a collaborative conversation between participants.

The contextual processing module 550 is configured to contextualize and determine which user is speaking in which type of device and environment. The contextual processing module 550 can also determine if the user is adding or asking for more information about specific entities relationships, actions or gaps.

The reasoning module 552 is an engine to infer and obtain insights to create a solution by processing current information in the knowledge graph base. The communication interface module 554 is configured for communication with, for example, a dashboard GUI (FIG. 1, 105).

Example Cloud Platform

As discussed above, functions relating to the low bandwidth transmission of high-definition video data may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
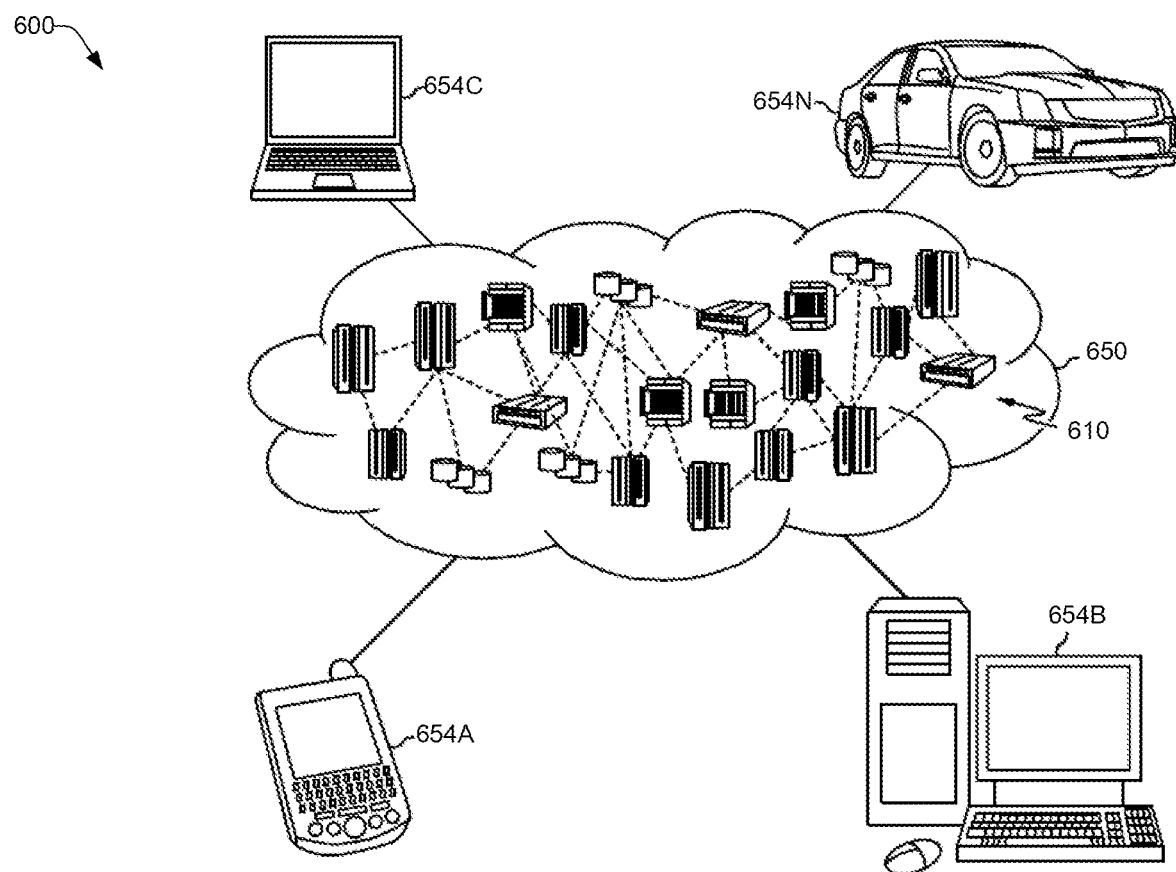
FIG. 6 depicts an illustrative cloud computing environment, consistent with an illustrative embodiment.

Referring now to FIG. 6, an illustrative cloud computing environment 600 utilizing cloud computing is depicted. As shown, cloud computing environment 600 includes cloud 750 6 having one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms, and/or software as services for which a cloud consumer does not need to maintain resources on a local computing device. It is understood that the types of computing devices 654A-N shown in FIG. 6 are intended to be illustrative only and that computing nodes 610 and cloud computing environment 600 can communicate with any type of computerized device over any type of network and/or network addressable connection (e.g., using a web browser).

Figure 7:
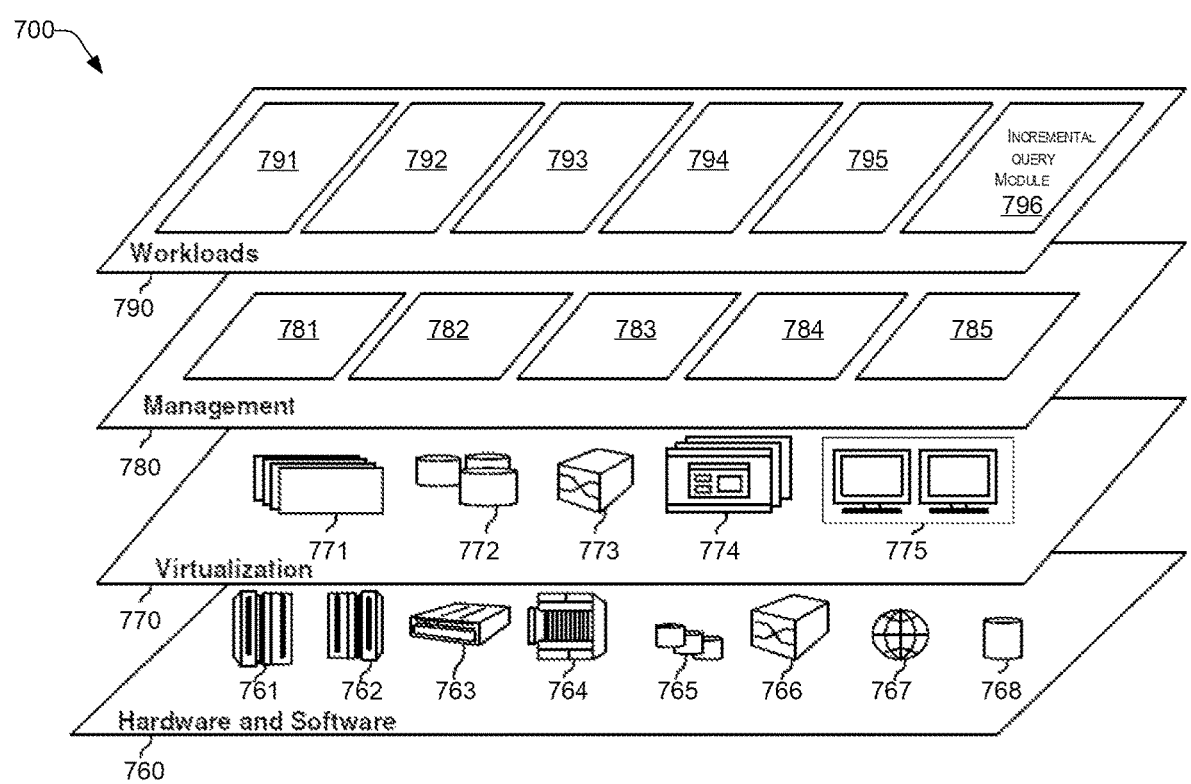
FIG. 7 depicts a set of functional abstraction layers provided by a cloud computing environment, consistent with an illustrative embodiment.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 include hardware and software components. Examples of hardware components include: mainframes 761; RISC (Reduced Instruction Set Computer) architecture-based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and an incremental query module 796 configured to perform incrementally specific queries through dialog understanding in real time, as discussed herein above.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, operations, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of performing an incremental specification of a query, the method comprising:
    extracting, by a computing device, text from each of a plurality of participants in a dialog;
    determining, by the computing device, a contextual information of the extracted text of one or more of the plurality of participants;
    performing, by the computing device, a dialog understanding operation by processing at least the contextual information of the extracted text in a knowledge graph to identify in the dialog at least one or more of a structural gap, an information about entities, relationships, or actions;
    providing, by the computing device, query information to at least one of the one or more of the plurality of participants, responsive to the dialog, wherein the query information being at least one of:
        one or more selectable options for filling the at least one identified structural gap, wherein the one or more selectable options are based on the identified structural gap; and
        additional information about one or more of the identified entities, relationships, and actions in the dialog;
    upon receiving a selection in response to the one or more selectable options, structuring the additional information in the knowledge graph; and
    improving an accuracy of the computing device in building the knowledge graph, via machine learning, based on a feedback received from at least one of the plurality of the participants, in response to the one or more selectable options.

2. The computer-implemented method of claim 1, wherein the query information is provided in real time.

3. The computer-implemented method of claim 2, further comprising incrementally providing additional query information based on an additional dialog of the plurality of participants.

4. The computer-implemented method of claim 2, further comprising incrementally providing additional query information in response to receiving feedback regarding previously-provided query information.

5. The computer-implemented method of claim 2, wherein the providing of the query information comprises a collaborative query based on multiple participants in the dialog, and the method further comprises:
    processing text extracted from a current speech; and structuring gaps and information as entitles, relations, and actions in the knowledge graph according to a domain ontology.

6. The computer-implemented method of claim 2, further comprising:
identifying an indirect query based on at least one participant asking other participants a question; and
providing the query information to all of the participants.

7. The computer-implemented method of claim 6, further comprising building directed nested contextualized hypergraphs to represent possible or indirect queries.

8. The computer-implemented method of claim 7, further comprising mapping each contextualized hypergraph with ontologies according to a hierarchy of specified concepts and indirections.

9. The computer-implemented method of claim 2, further comprising using natural language processing for the determining of the contextual information of the extracted text of the plurality of participants.

10. The computer-implemented method of claim 2, further comprising identifying and contextualizing concepts according to a dialog evolution, an environment, and a profile of the plurality of participants.

11. A computing device configured to perform an incremental specification of a query, the computing device comprising:
a processor;
a memory coupled to the processor, the memory storing instructions to cause the processor to perform acts comprising:
extracting text from each of a plurality of participants in a dialog;
determining a contextual information of the extracted text from one or more of the plurality of participants;
performing a dialog understanding operation by processing at least the contextual information of the extracted text in a knowledge graph to identify in the dialog at least one or more of a structural gap, an information about entities, relationships, or actions;
outputting query information to at least one of the one or more of the plurality of participants, responsive to the dialog, wherein the query information being at least one of:
one or more selectable options for filling the at least one identified structural gap, wherein the one or more selectable options are based on the identified structural gap; and
additional information about one or more of the identified entities, relationships, and actions in the dialog;
upon receiving a selection in response to the one or more selectable options, structuring the additional information in the knowledge graph; and
improving an accuracy of the computing device in building the knowledge graph via machine learning, based on a feedback received from at least one of the plurality of participants, in response to the one or more selectable options.

12. The computing device of claim 11, wherein:
the query information is output to a dashboard;
the instructions cause processor to perform additional acts including the providing of the query information as a collaborative query based on multiple participants in the dialog; and
the query information is provided in real time.

13. The computing device of claim 11, wherein the instructions cause the processor to perform an act comprising providing additional query information based on additional dialog of the plurality of participants.

14. The computing device of claim 11, wherein the instructions cause the processor to perform an act comprising incrementally providing additional query information in response to receiving feedback regarding previously-provided query information.

15. The computing device of claim 11, wherein the instructions cause the processor to perform additional acts comprising:
identifying an indirect query based on at least one participant asking other participants a question; and
outputting the query information to one or more of the participants.

16. The computing device of claim 11, wherein the instructions cause the processor to perform additional acts comprising building directed nested contextualized hypergraphs to represent possible or indirect queries.

17. The computing device of claim 11, wherein the instructions cause the processor to perform additional acts comprising mapping each contextualized hypergraph with ontologies according to a hierarchy of specified concepts and indirections.

18. The computing device of claim 11, wherein the instructions cause the processor to perform additional acts comprising using a natural language processing for the determining of the contextual information of the extracted text of the plurality of participants.

19. The computing device of claim 11, wherein the instructions cause the processor to perform additional acts comprising identifying and contextualizing concepts according to a dialog evolution, an environment, and a profile of the plurality of participants.

20. A computing device configured to perform an incrementally specific query, the computing device comprising:
one or more processors including a dialog processor configured to process extracted text of a plurality of participants of a collaborative query;
a memory coupled to the at least one processor, wherein the processor is configured with a plurality of modules including:
a capture manager configured to provide audio content to the dialog processor;
a knowledge structurer configured to identify structural gaps and information as entities, relationships, and actions in a knowledge graph; and
a dialog manager configured to process the knowledge graph and to retrieve from a knowledge graph base a set of entities, relationships and actions to fill the identified structural gaps,
wherein the computing device is able to:
upon receiving a selection in response to one or more selectable options, structure additional received information in the knowledge graph; and
improve its accuracy in building the knowledge graph, via machine learning, based on a feedback received to the previously-identified gaps.

* * * * *